Figure 1:
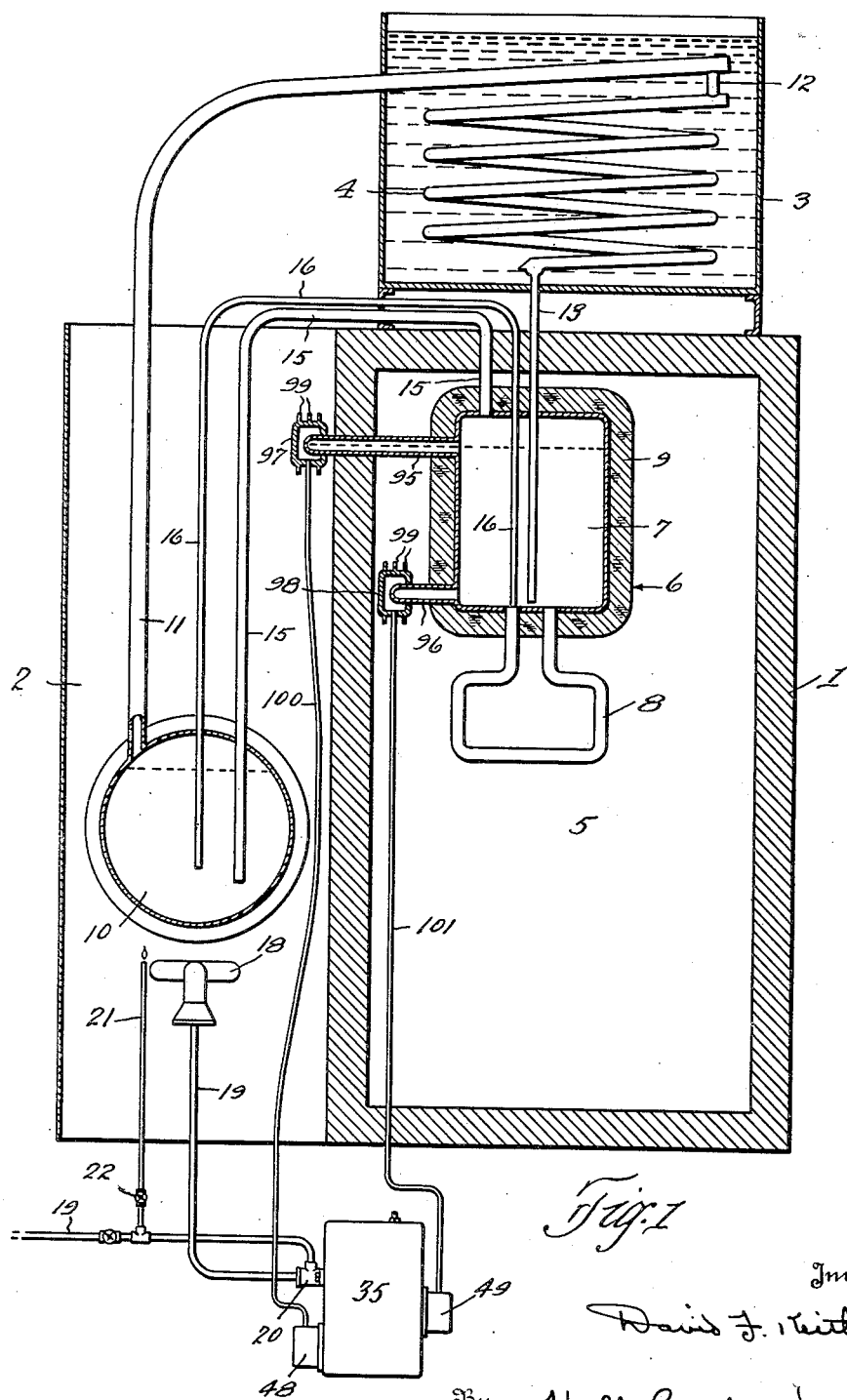

July 18, 1933.  D. F. KEITH  1,918,969
AUTOMATIC CONTROL FOR INTERMITTENT ABSORPTION REFRIGERATION APPARATUS
Filed June 20, 1931   2 Sheets-Sheet 2
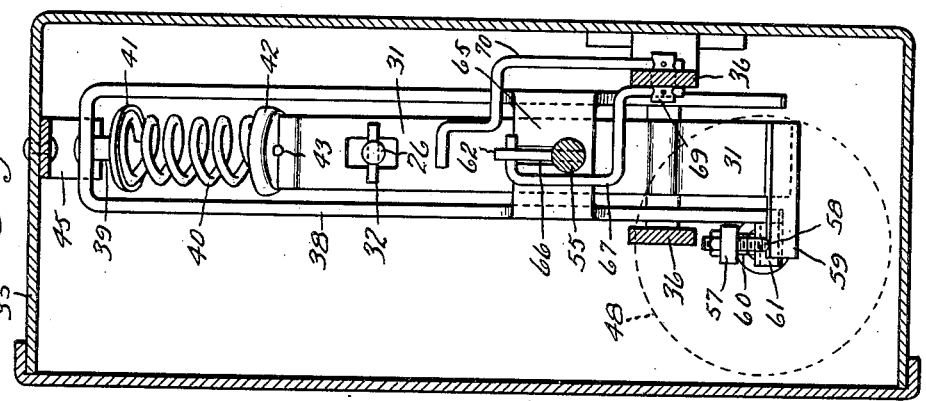
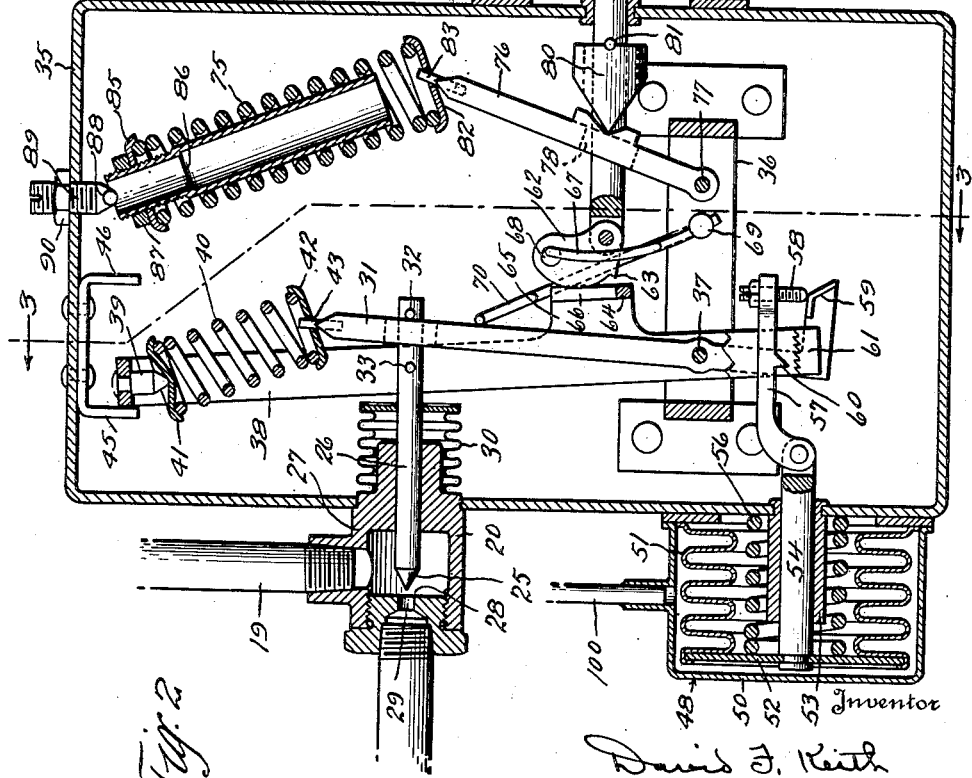
Inventor
David F. Keith
By Hull, Brock & Wear
Attorneys.

Patented July 18, 1933

1,918,969

UNITED STATES PATENT OFFICE

DAVID F. KEITH, OF CLEVELAND HEIGHTS, OHIO, ASSIGNOR TO PERFECTION STOVE COMPANY, OF CLEVELAND, OHIO, A CORPORATION OF OHIO

AUTOMATIC CONTROL FOR INTERMITTENT ABSORPTION REFRIGERATION APPARATUS

Application filed June 20, 1931. Serial No. 545,800.

This invention relates to an automatic control for refrigeration apparatus of the intermittent absorption class. The invention is especially adapted for use with gas fired absorption refrigerating machines and for that reason is so disclosed herein.

The primary purpose of the invention is to provide a simple and thoroughly reliable automatic control for absorption refrigeration apparatus that insures the maximum of refrigerating efficiency from the minimum consumption of the heating medium. To this end the control involves thermosensitive means influenced by the respective high and low liquid level conditions in the receiver-evaporator for effecting the turning off and governing the turning on of the heat. In the one case the heat is turned off by the accumulation of the required amount of distilled refrigerant in the receiver-evaporator, and in the other the heat is prevented from being turned on until all, or practically all, of the refrigerant liquid is exhausted from the receiver-evaporator, the turning on being further governed by the temperature of the refrigeration space.

My improved control, according to the present embodiment, involves receptacles that, while being otherwise closed, communicate with the receiver-evaporator at different levels and into which the receiver-evaporator overflows, so to speak. The elevation of the upper receptacle corresponds to the maximum liquid level in the receiver-evaporator, and that of the lower, approximately to the maximum liquid level. The heating means is rendered effective and ineffective by control mechanism that is governed by thermostatic means arranged in heat exchanging relation to the aforesaid receptacles. The thermostatic means associated with the upper receptacle is preferably situated so as to receive heat from the heating means of the generator-absorber, while that associated with the lower receptacle is subjected to the temperature of the refrigeration space of the apparatus.

The purpose above stated, with other objects hereinafter appearing, is attained in the embodiment of the invention illustrated in the accompanying drawings wherein Fig. 1 represents, more or less diagrammatically, a sectional elevation of refrigeration apparatus incorporating my improved automatic control; Fig. 2 is a sectional front elevation of the control mechanism, and Fig. 3 is a section on the line 3—3 of Fig. 2.

The apparatus is shown as comprising an insulated cabinet 1 and a heating compartment 2 that are arranged side by side. Surmounting the cabinet 1 is a tank 3 that encloses a coil of tubing designated 4, the tank and coil constituting a condenser of ordinary form. The tank 3 contains a quantity of cooling liquid, such as water.

The cabinet 1 encloses the refrigeration space 5, and situated within the top portion of said space is the receiver-evaporator that is designated generally by the reference numeral 6. The same is shown as consisting of a vessel 7 which constitutes the receiver portion of the unit, and a coil 8 that depends from and communicates with said vessel and forms the evaporator portion of the unit. The vessel 7 is encased within a jacket 9 of insulating material.

Located within the lower portion of the heating compartment 2 is the generator-absorber 10. A vapor delivery conduit 11 leads from the top portion of the generator-absorber upwardly and laterally through the side of the tank 3 and is joined, through a pipe 12, with the upper end of the condenser coil 4. A tube 13 leads downwardly from the opposite end of said coil through the bottom of the tank 3 and the top of the cabinet 1 and into the receiver 7, the same terminating within the receiver adjacent the bottom thereof. The portion of the conduit 11 inside the tank 3 is shown as gradually inclined upwardly toward its outlet end and as being submerged within the cooling liquid. This portion of the conduit serves as a dehydrator for the vapors that rise from the generator-absorber, as will more fully appear hereinafter.

A gas return conduit 15 leads from the upper end of the receiver 7 through the top of the cabinet 1 and thence laterally and downwardly into the generator-absorber and terminates below the minimum liquid level therein. A tube 16 leads from the bottom portion of the receiver-evaporator upwardly through the tops of the receiver and cabinet and thence laterally and downwardly into the generator-absorber, the same constituting a liquid return device which serves to carry over into the generator-absorber any residue liquid or absorbent condensate that is left in the receiver-evaporator at the conclusion of a cooling period, such transfer of liquid occurring at the beginning of the next heating period. The manner in which this liquid return device functions is fully disclosed in Letters Patent No. 1,816,975, dated August 4, 1931.

The system comprising the generator-absorber, receiver-evaporator and the various conduits through which they communicate is hermetically sealed and contains the required quantity of a mixture consisting of a refrigerant and an absorbent therefor, in suitable proportions. The former may consist of ammonia, and the latter of water.

Suitably supported below the generator-absorber 10 is a gas burner 18 that receives its supply of gas from a suitable source through a pipe 19 that includes a valve designated generally by the reference character 20. A pilot light 21 serves to ignite the burner 18, and the same is shown as communicating with the gas supply pipe 19, and as being equipped with a valve 22.

The automatic control which constitutes the subject matter of my present invention, and which I will now describe, includes mechanism associated with the valve 20 for actuating the same; receptacles which communicate with the receiver 7 at different elevations and in such manner that the liquid contents thereof may overflow into them, and thermosensitive means associated with said receptacles and which function to actuate the aforesaid mechanism thereby to open and close the valve.

As best shown in Fig. 2, the valve 20 is of the "needle" variety and the valve proper, designated 25, is formed by the tapered inner end of a stem 26 that is guided within a bore of the casing 27 toward and from a seat 28 that surrounds the outlet port 29 of the casing. Leakage about the stem 26 is prevented by a metallic bellows 30 that surrounds the stem and has one of its ends sealed thereto and its opposite end sealed to the casing. The outer end of the stem 26 projects through an opening in a toggle arm 31 and carries pins 32 and 33 on opposite sides thereof wherewith said arm is adapted to engage. The working parts of the valve operating mechanism are enclosed within a casing 35, and secured to the rear wall of the casing near the bottom thereof is a substantial frame 36 that supports a shaft 37 on which the toggle arm 31 is pivoted. Similarly mounted upon the shaft 37 is a U-shaped member or yoke 38 by the top portion of which is carried a pointed stud 39. A spring 40 is compressed between spring seats 41 and 42, the former being dished and bearing against the pointed end of the stud 39, while the spring seat 42 has a central aperture that is engaged over a projection 43 on the upper end of the toggle arm 31, this spring seat being adapted to rock upon the knife edge bearing provided by the tapered upper end of said arm. The upper end of the yoke 38 is adapted to swing between stops 45 and 46, and it is manifest that when the yoke is swung between said stops it will throw the toggle joint consisting of the spring 40 and the toggle arm 31 "over center" so to speak, or, in other words, through the vertical axis of the shaft 37 on which the yoke 38 and toggle arm 31 are pivoted. As is clear from Fig. 2, when the yoke 38 is in engagement with the stop 45 the toggle joint is in position to retain the valve 25 off its seat; and it is equally clear that when the yoke is swung over into engagement with the stop 46 it will snap the toggle joint over center in the direction opposite that in which it is moving and close the valve.

Applied to opposite sides of the casing 35 are what I shall refer to, for convenience of description, as bellows 48 and 49, these reference numerals referring generally to the respective units. Each consists of a casing 50 that encloses a diaphragm or bellows 51, whose inner ends are sealed to the rim of the casing 50 and whose outer ends are connected with a leak-proof joint to a disk 52. Supported by the walls of the casing 35 to which the bellows are connected, and axially of the bellows or diaphragms, are sleeves 53 within which pins are guided whose outer ends are connected to the disks 52. The pins of the respective bellows 48 and 49 are designated 54 and 55. A relatively heavy coil spring 56 surrounds the guide 53 of the bellows 48 and is interposed between the disk 52 and the opposed wall of the casing 35, said spring tending to retain the pin 54 in retracted position.

Pivoted to the forward end of the pin 54 is a pawl 57 whose free end is adapted to be sustained, under certain conditions, through the medium of an adjusting screw 58 that it carries, by a cam 59 that is fixed to the lower end of the toggle arm 31. The nose 60 of the pawl 57 is arranged for cooperation with a ratchet 61 that is fastened to the lower end of the adjacent branch of the yoke 38.

To the forward end of the pin 55 of the bellows 49 is pivoted a dog 62 having a tooth 63 for cooperation, under certain conditions, with an abutment 64 on the yoke 38, said abutment being constituted of the lower portion of a bridge 65 that connects the branches of the yoke, the bridge being notched above said abutment, as indicated at 66, for the accommodation of the dog 62 during relative movement between it and the yoke. The dog 62 is raised and lowered so as to dispose its tooth 63 out of operative relation and in operative relation, respectively, to the abutment 64 by means of an arm 67 whose upper end is engaged through an enlarged aperture 68 of the dog and whose lower end is fastened to the forward end of a shaft 69 that is journaled in an adjacent part of the frame 36. The rear end of said shaft has secured to it a lever 70 whose forwardly offset upper end bears against the side of the toggle arm 31. It is clear from Fig. 2 that, when the toggle arm 31 is in the position it occupies when the valve is open, the dog is sustained in elevated position. When, however, the toggle arm is swung in a direction to close the valve, the lever 70 is permitted to swing in a corresponding direction and, through the shaft 69 and arm 67, lower the dog so that its forward portion projects through the slot 66 and rests upon the abutment 64 with the tooth 63 in a position to engage said abutment when the dog is moved forwardly by the projection of the pin 55.

The projection of the pin 55 is opposed by a relatively stiff spring 75 through the intervention of an arm 76 that is pivoted on a shaft 77 supported by and between the opposed members of the frame 36. This arm has an aperture 78 through which the pin extends and on opposite sides of the pin said arm has a knife edge bearing on the forward end of a sleeve 80 that loosely surrounds the pin 55 and bears on a cross pin 81 that is carried by the former pin, the sleeve being notched to accommodate said cross pin. A perforated spring seat 82 is engaged over a projection 83 on the upper end of the arm 76 and said seat has a rocking bearing on the tapered upper end of said arm. The opposite end of this spring is received by an annular seat 85 that surrounds the threaded upper end of a sleeve 86 and bears against a nut 87 that is threaded onto said sleeve. By reason of this arrangement, the tension of the spring 75 may be adjusted. The sleeve 86 rocks on a cross bar 88 carried by a stud 89 that is threaded through the top wall of the casing 35 and has applied to it a lock nut 90 above said wall.

Receptacles 95 and 96 (Fig. 1) communicate with and extend laterally from the vessel 7 of the receiver-evaporator at different elevations, the former being located at approximately the maximum liquid level of the vessel, while the other is adjacent the bottom thereof. These receptacles are in the nature of tubes whose outer ends are closed and surrounded by vessels 97 and 98, shown as equipped with heat abstracting fins 99. The receptacle 95 extends through the adjacent wall of the cabinet 1 so that the vessel 97 that surrounds its outer end is in the heating compartment 2. The vessel 98, which surrounds the outer end of the receptacle 96, is disposed within the refrigeration space 5. The vessel 97 is joined to the bellows 48 by a tube 100, and the vessel 98 is joined to the bellows 49 by a tube 101. These vessels and tubes and the spaces between the casings 50 and the diaphragms 51 contain a thermosensitive fluid.

In considering the operation of the apparatus, let it be supposed that the same is being started for the first time or, if not for the first time, after a prolonged period of idleness, so that the two vessels 97 and 98 are at room temperature, in which condition the pin 55 of the bellows 49 is in its projected position and the gas valve 20 is open. It will also be assumed that all, or practically all, of the liquid in the system is in the generator-absorber. The gas may now be turned in through the supply line 19 and the pilot and main burners lighted. The heat rises up about the generator-absorber and through the upper portion of the heating compartment 2 about the vessel 97. As a result of the application of heat to the generator-absorber, the liquid within this vessel boils and the vapors rise through the conduit 11. As they ascend through the upper inclined portion of the conduit that is located within the tank 3, the refrigerant vapors will be dehydrated to a greater or less degree and will continue on through the coil 4 wherein they will be condensed and from which they will gravitate through the tube 13 to the receiver 7. This distillation of the refrigerant will continue until the level of liquid within the receiver rises sufficiently to overflow into the receptacle 95 and by reason of the presence of the relatively cool refrigerant liquid in said receptacle, the thermosensitive fluid in the vessel 97 will be chilled, causing it to contract.

Now it should be explained that when the vessel 97 is raised in temperature by the heat rising from the burner 18, its contents is expanded which compresses the diaphragm 51 of the so-called bellows 48, thereby to project the pin 54 against the tension of the spring 56. The projection of this pin advances the pawl 57 until the adjusting screw 58 by means of which it is supported from the cam 59 leaves the cam and allows the nose 60 to engage the teeth of the ratchet 61. The nose of the pawl is well advanced toward the right hand end of the ratchet, as the parts are viewed in Fig. 2, and when the fluid in the vessel 97 is chilled by the presence of the relatively cool refrigerant liquid in the receptacle 95, as above explained, said fluid will contract and allow the spring 56 to retract the pin 54 thereby to swing the lower end of the yoke 38 to the left through the instrumentality of the pawl 57 and ratchet 61, the top of the yoke swinging over against the stop 46. During this swinging of the yoke, the position of the toggle joint comprising the spring 40 and arm 31 is reversed and the valve 25 is thereby seated to shut off the supply of gas to the burner.

When the toggle mechanism is thus tripped to close the valve, the lever 70 follows the toggle arm 31 thereby to swing the arm 67 downwardly and allow the dog 62 to drop so that, when the pin 65 is retracted, the tooth 63 of the dog will be disposed in operative relation to the abutment 64.

When the burner is turned off as described, the evaporation or cooling period begins and it continues until all or practically all of the anhydrous refrigerant has been evaporated from the receiver-evaporator, the refrigerant gas during this period passing back to the generator-absorber through the conduit 15. This phase of the operation results in lowering the temperature of the refrigeration space 5 and early in such phase the contents of the vessel 98 is chilled and contracts and allows the spring 75, through the intervention of the arm 76, to retract the pin 55 of the bellows 49. The parts remain in their present condition until the refrigerating effect of the evaporator ceases and the temperature of the refrigeration space rises enough to cause the contents of the vessel 98 to expand and project the pin 55 so that, through the intervention of the dog 62, the yoke 38 will be swung over center toward the position which it occupies in Fig. 2. The latter portion of the movement is, of course, caused by the expansion of the spring 40, after the toggle arm 31 has been thrown over center in the reverse direction to that in which the yoke 38 is moving. In its newly assumed position, the arm 31 lifts the lever 70 and, through the arm 67, the dog 62 so that the tooth 63 thereof is out of the way of the abutment 64. With the dog in this position, there can be no interference therefrom with the swinging of the yoke 38, regardless of the position of the pin 55; and the swinging of the toggle arm 31 to the position to bring about these conditions also shifts the cam 59 that is carried by its lower end in such position with respect to the adjusting screw 58 of the pawl 57 as to allow the tooth of said pawl to engage the ratchet 61 when the pin 54 of the bellows 48 is projected to any appreciable extent.

When the mechanism operates in response to the expansion of the fluid in vessel 98, as just described, the valve 20 is opened and the burner 18 is ignited by the pilot light 21 and another cycle of operation is started.

From the foregoing it will be seen that my invention provides an automatic control for absorption refrigerating machines that is dependent for its action upon the quantity of liquid in the receiver-evaporator, and upon the temperature of the refrigeration space. It is very evident that this results in the highest economy as well as efficiency inasmuch as the heat is not turned on until all or practically all of the anhydrous refrigerant has been exhausted from the receiver-evaporator and the temperature of the refrigeration space has risen to a predetermined high degree; and the heat will not be shut off until the required amount of refrigerant has been distilled over into the receiver-evaporator. The temperature at which the heat is turned on, or, in other words, the maximum temperature of the refrigeration space, may be varied by adjusting the tension of the spring 75.

With respect to the valve actuating mechanism attention is called to the fact that the operative connections between each of the bellows 48 and 49 and the yoke 38 is automatically rendered ineffective when those of the other are effective, thereby to avoid interference with the operation of one by the other.

Having thus described my invention, what I claim is:

1. In refrigeration apparatus of the intermittent absorption class, in combination with the generator-absorber and the receiver-evaporator and the communicative connections between them essential to a complete operative cycle, means for heating the generator-absorber, control mechanism for the heating means, thermostatic means for governing the action of the control mechanism, and a receptacle independent of the aforesaid connections and which is in communication with the receiver-evaporator and is otherwise closed and into which liquid flows from the receiver-evaporator upon attaining a predetermined elevation therein, said thermostatic means being in heat exchanging relation to said receptacle.

2. In refrigeration apparatus of the intermittent absorption class, in combination with the generator-absorber and the receiver-evaporator and the communicative connections between them essential to a complete operative cycle, means for heating the generator-absorber, control mechanism for the heating means, thermostatic means for governing the action of the control mechanism, and a receptacle independent of the aforesaid connections, said receptacle communicating with the lower portion of the receiver-evaporator and being otherwise closed and which is adapted to be flooded by liquid therefrom when the liquid level in the receiver-evaporator is anywhere above a relatively low elevation therein, said thermostatic means being in heat exchanging relation to said receptacle.

3. In refrigeration apparatus of the intermittent absorption class, in combination with the generator-absorber and the receiver-evaporator and the communicative connections between them essential to a complete operative cycle, means for heating the generator-absorber, control mechanism for the heating means, thermostatic means for governing the action of the control mechanism, and a receptacle independent of the aforesaid connections and which is in communication with the receiver-evaporator and is otherwise closed and into which liquid flows from the receiver-evaporator upon attaining a predetermined elevation therein, said thermostatic means being in heat exchanging relation to both said receptacle and the heating means.

4. In an absorption refrigerating machine, heating means for the generator-absorber, and mechanism for controlling the action thereof including thermosensitive means subjected to a predetermined high liquid level condition in the receiver-evaporator and adapted to be so affected thereby as to cause said mechanism to render the heating means ineffective, and a second thermosensitive means subjected to the presence of any appreciable amount of liquid in the receiver-evaporator and adapted in the absence thereof to be so affected by the temperature of the surrounding air as to cause said mechanism to render the heating means effective.

5. In an absorption refrigerating machine, heating means for the generator-absorber, mechanism for rendering said means effective and ineffective, thermosensitive means subjected to a predetermined high liquid level condition in the receiver-evaporator for causing said mechanism to operate to render said heating means ineffective, and a second thermosensitive means subjected to the temperature of the refrigeration space and to the temperature of the liquid contents of the receiver-evaporator when the same is above a predetermined low level for causing said mechanism to function to render the heating means effective when the second mentioned thermosensitive means is unaffected by the liquid contents of the receiver-evaporator and the temperature of the refrigeration space in above a predetermined value.

6. In an absorption refrigerating machine, heating means for the generator-absorber, and a control therefor involving two thermosensitive means by one of which the control is actuated to start the heating period of a cycle of operation and by the other of which the control is actuated to stop said heating period, said thermosensitive means being subjected to the temperature of the liquid contents of the receiver-evaporator and influenced to perform their functions by the high and low liquid level conditions therein, respectively.

7. In an absorption refrigerating machine, heating means for the generator absorber, mechanism for rendering the same effective and ineffective, and two thermosensitive means for actuating said mechanism, one so arranged as to be affected by a predetermined high liquid level condition in the receiver-evaporator so as to cause the mechanism to operate and render the heating means ineffective, and the other so arranged as to be affected by the presence of liquid in the receiver-evaporator above a predetermined low level so as to prevent the heating means from being rendered effective until said liquid reaches said low level.

8. In an absorption refrigerating machine, heating means for the generator-absorber, mechanism for rendering the same effective and ineffective, and two thermosensitive means, the first of which acts under the influence of a predetermined low temperature to operate said mechanism and cause it to render said heating means ineffective, and the second of which acts under the influence of a predetermined high temperature to operate said mechanism and cause it to render the heating means effective, both thermosensitive means being subjected to the temperature of the liquid in the receiver-evaporator, the first when said liquid has attained a predetermined high level, and the second while said liquid is above a predetermined low level.

9. In an absorption refrigerating machine, heating means for the generator-absorber, mechanism for rendering the same effective and ineffective, two thermosensitive means for actuating said mechanism, the first of which is arranged in heat exchanging relation to the heating means and the second of which is subjected to the temperature of the refrigeration space, an overflow receptacle communicating with the receiver-evaporator approximately at the maximum liquid level thereof and which is arranged in heat exchanging relation to the first mentioned thermosensitive means, and a second receptacle communicating with the receiver evaporator at a relatively low level and arranged in heat exchanging relation to the second mentioned thermosensitive means.

10. In an absorption refrigerating machine, means for heating the generator-absorber, and a control for said heating means involving two thermosensitive means, one of which is adapted to be chilled by the refrigerant liquid in the receiver-evaporator when the same has attained a predetermined high level and serving when chilled to render the heating means ineffective, and the other of which is adapted to be retained below a predetermined temperature value so long as there is any appreciable amount of liquid in the receiver-evaporator and acting under the influence of a temperature above said predetermined value to render the heating means effective.

11. In an absorption refrigerating machine, heating means for the generator absorber, and thermostatically actuated control mechanism for rendering said heating means effective and ineffective, the same involving two thermosensitive means, one so arranged as to be chilled by an accumulation of refrigerant liquid in the receiver-evaporator to a predetermined elevation, and the other so arranged as to be maintained below a predetermined temperature by the presence of refrigerant liquid in the receiver-evaporator up to a given level, the first mentioned thermosensitive means, when chilled, causing said mechanism to function to render the heating means ineffective, and the second mentioned thermosensitive means, when above said predetermined temperature, causing said mechanism to function to render the heating means effective.

12. In an absorption refrigerating machine, heating means for the generator-absorber, receptacles communicating with the receiver-evaporator at different elevations and into which the contents thereof is adapted to flow, control mechanism for rendering the heating means effective and ineffective, the same involving two thermosensitive means that are associated, respectively, with the aforesaid receptacles, the one associated with the higher receptacle being in heat exchanging relation thereto and in the range of heat of the heating means, while the one associated with the lower receptacle is in heat exchanging relation thereto and to the refrigeration space of the machine, the first mentioned thermosensitive means when chilled by the presence of refrigerant liquid in the corresponding receptacle causing the control mechanism to function to render the heating means ineffective, and the other of said thermosensitive means, when its temperature rises by reason of the absence of refrigerant liquid in the corresponding receptacle and by reason of the temperature of the refrigeration space rising to a predetermined degree, causing said mechanism to function to render the heating means effective.

13. In an absorption refrigerating machine comprising a heating chamber in which the generator-absorber is situated and a refrigeration compartment in which the receiver-evaporator is located, heating means for the generator-absorber, two receptacles communicating with the receiver-evaporator at different elevations, control mechanism for rendering the heating means effective and ineffective, the same involving two thermosensitive means associated, respectively, with the aforesaid receptacles, the one associated with the upper receptacle being in heat exchanging relation thereto and located in the heating chamber, while the thermosensitive means associated with the lower vessel is arranged in heat exchanging relation thereto and to the refrigeration compartment, the thermosensitive means that is associated with the upper receptacle, when chilled by the presence of refrigerant liquid in said receptacle, causing the control mechanism to operate to render the heating means ineffective, and the other of said thermosensitive means, when its temperature is permitted to rise by the absence of refrigerant fluid in the corresponding receptacle and by a rise in temperature of the refrigeration compartment above a predetermined degree, causing said control mechanism to operate to render the heating means effective.

14. In an automatic control, means for effecting operation of an apparatus, a device movable to alternately render said means effective and ineffective, an instrumentality for moving the device for one of said purposes, a second instrumentality for moving the device for the other of said purposes, separable operative connections between each of said instrumentalities and said device, and means for throwing out the operative connections of each instrumentality after such instrumentality has performed its function.

15. In an automatic control, means for effecting operation of an apparatus, a device movable to alternately render said means effective and ineffective, an instrumentality for moving the device for one of said purposes, a second instrumentality for moving the device for the other of said purposes, separable operative connections between each of said instrumentalities and said device, and means controlled by said device for throwing out the operative connections of each instrumentality after such instrumentality has performed its function.

16. In combination with artificial refrigeration apparatus, means for effecting operation of the same, a device movable to alternately render said means effective and ineffective, an instrumentality for moving the device for one of said purposes, a second instrumentality for moving the device for the other of said purposes, separable operative connections between each of said instrumentalities and said device, and means operating automatically for throwing out the operative connections of each instrumentality after such instrumentality has performed its function.

17. In combination with an absorption refrigerating machine, means for heating the generator-absorber, and control mechanism therefor comprising a device movable to alternately render the heating means effective and ineffective, an instrumentality for moving the device for one of said purposes, a second instrumentality for moving the device for the other of said purposes, separable operative connection between each of said instrumentalities and said device, and means actuated by a part of the mechanism for throwing out the operative connections of each instrumentality after such instrumentality has performed its function.

18. In combination with an absorption refrigerating machine, a gas burner for heating the generator-absorber, a valve for controlling the supply of gas to the burner, and control mechanism therefor comprising a device movable to alternately open and close the valve, an instrumentality for moving the device for one of said purposes, a second instrumentality for moving the device for the other of said purposes, separable operative connections between each of said instrumentalities and said device, and means actuated by a part of the mechanism for throwing out the operative connections of each instrumentality after such instrumentality has performed its function.

DAVID F. KEITH.